No. 749,277. PATENTED JAN. 12, 1904.
C. E. ELLICOTT & J. B. NORRIS.
CRANK AND CRANK SHAFT MECHANISM.
APPLICATION FILED AUG. 28, 1903.

NO MODEL.

Witnesses:
Henry Watson
Howard Habercam.

Inventors:
Charles E. Ellicott
John B. Norris
By Chapin A. Ferguson
Attorney.

No. 749,277. Patented January 12, 1904.

UNITED STATES PATENT OFFICE.

CHARLES E. ELLICOTT AND JOHN B. NORRIS, OF BALTIMORE, MARYLAND.

CRANK AND CRANK-SHAFT MECHANISM.

SPECIFICATION forming part of Letters Patent No. 749,277, dated January 12, 1904.

Application filed August 28, 1903. Serial No. 171,045. (No model.)

*To all whom it may concern:*

Be it known that we, CHARLES E. ELLICOTT and JOHN B. NORRIS, citizens of the United States, residing at Baltimore, in the State of Maryland, have invented certain new and useful Improvements in Cranks and Crank-Shaft Mechanism, of which the following is a specification.

This invention relates to improvements in crank and crank-shaft mechanism.

The object of the invention is to provide the crank and crank-shaft with means whereby the shaft may be turned by the crank or the crank be caused to remain stationary while the shaft is revolved by other means.

Other features of the invention will be fully set forth in the description of the accompanying drawings, in which—

Figure 1:
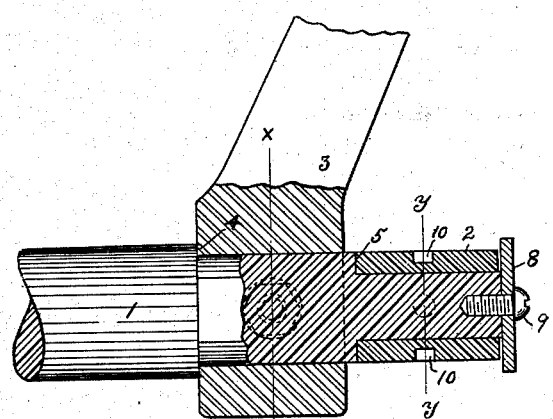
Figure 2:
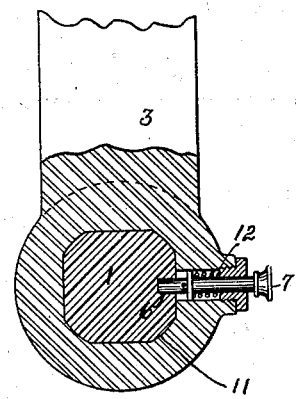
Figure 3:
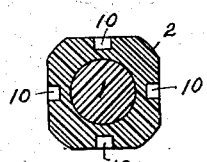
Figure 4:
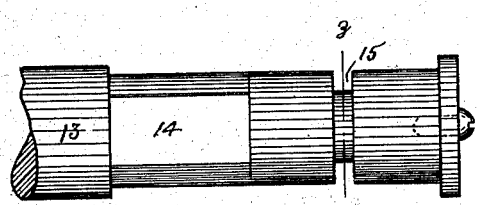
Figure 5:
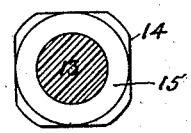

Figure 1 is a vertical central section of the outer end of a crank-shaft having the crank thereon, the latter being partly in section and partly broken away. Fig. 2 is a cross-section on the line X X of Fig. 1. Fig. 3 is a cross-section on the line Y Y of Fig. 1. Fig. 4 is a modification of the end of the crank-shaft, and Fig. 5 is a cross-section on the line Z Z of Fig. 4.

Similar reference-numerals designate like parts throughout the several views of the drawings.

Referring to the accompanying drawings, forming part of this specification, 1 designates the crank-shaft, 2 the revoluble sleeve, and 3 the crank.

The crank-shaft 1 is provided with a shoulder 4, against which the crank 3 impinges, and a shoulder 5, against which the sleeve 2 impinges. The shaft 1 between the shoulders 4 and 5 is square in cross-section and is provided with an aperture 6 in one side for the reception of the pin 7. From the shoulder 5 to its outer extremity the shaft 1 is considerably smaller and is circular in cross-section.

The sleeve 2 is revolubly mounted on the outer circular end of the shaft 1 and has one end impinging against the shoulder 5 and the other end impinging against the disk 8, which latter is held to the end of the shaft 1 by the screw 9. The outer surface of the sleeve 2 is square in cross-section to correspond to the square portion of the shaft 1 and is provided with an aperture 10 in each side for the reception of the pin 7 when the crank 3 is moved out upon the said sleeve 2.

The crank 3 is provided with a square aperture 11, corresponding to the square portion of the shaft 1 and the square outer surface of the sleeve 2, and is adapted to be moved from the said shaft to the sleeve or from the sleeve to the shaft, as desired. One side of the crank 3 is provided with a pin 7, held to its normal position by the coiled spring 12.

When it is desired to revolve the shaft 1 by hand-power, the crank 3 is placed on the square portion of the said shaft 1 and is held from moving endwise thereon by the pin 7 projecting into the aperture 6 in the said shaft. When it is desired to operate the shaft 1 by motive power, the pin 7 is withdrawn from the aperture 6 and the crank 3 moved onto the sleeve 2 until the pin 7 comes into line with the apertures 10, when it will be forced into one of said apertures 10 by the action of the spring 12. The disk 8 prevents the crank 3 from being moved too far out on the sleeve 2. The weight of the crank 3 will cause it to hang pendent, and the said crank and sleeve 2 will remain stationary while the shaft 1 is revolving. When the shaft 1 is again to be driven by hand-power, the pin 7 is withdrawn from the aperture 10 in the sleeve 2 and the crank 3 moved back onto the square portion of the shaft until the said pin 7 registers with the aperture 6, whereupon it will be forced into said aperture by the action of the spring 12.

In Figs. 4 and 5 we have shown a side elevation and a cross-section, respectively, of a modification of the crank-shaft. In this modification the shaft 13 is provided with a square portion 14, the same as described for the previous figures. From the said square portion 14 to its outer end the shaft 13 is circular in cross-section and is provided with an annular groove 15, into which the pin 7 projects, which permits the crank 3 to hang pendent and remain stationary when the shaft 13 is driven by motive power.

Having thus described our invention, what we claim is—

1. The combination of a shaft; a sleeve mounted upon, and revoluble independent of, the said shaft; and a crank for revolving the shaft and adapted to be moved from the shaft onto the said sleeve, as and for the purpose described.

2. The combination of a shaft; a sleeve revolubly mounted upon the said shaft; a crank fitted upon the shaft and adapted to be moved from the shaft onto the sleeve, when it is desired to revolve the said shaft independent of the crank, as shown and described.

3. The combination of a shaft; a sleeve revolubly mounted on the said shaft and having a plurality of apertures in its outer surface; a crank adapted to be moved from the shaft to the sleeve; and a pin projecting through one side of the crank and adapted to be forced into the apertures in the said sleeve; as and for the purpose described.

4. The combination of a shaft having a square portion near its end; a sleeve revolubly mounted on the end of the said shaft and having its outer surface square to correspond to the square portion of the shaft and a plurality of apertures in its outer surface; a crank having a square aperture to fit over the square portion of the shaft and adapted to be moved onto the said sleeve; and a pin carried by the crank and adapted to be forced into the apertures in the outer surface of the said sleeve, as and for the purpose described.

5. The combination of a shaft having a square portion near its end; a sleeve revolubly mounted on the end of the said shaft and having its outer surface square to correspond to the square portion of the shaft and a plurality of apertures in its outer surface; a crank having a square aperture to fit over the square portion of the shaft and adapted to be moved onto the said sleeve; a pin carried by the crank and adapted to be forced into the apertures in the outer surface of the said sleeve; and a disk secured to the outer end of the said shaft to prevent sidewise movement of the said sleeve.

In testimony whereof we affix our signatures in the presence of two witnesses.

CHARLES E. ELLICOTT.
JOHN B. NORRIS.

Witnesses:
CHARLES H. MILLIKIN,
ROBERT A. B. COOK.